United States Patent [19]

Chaundy

[11] Patent Number: 4,717,358
[45] Date of Patent: Jan. 5, 1988

[54] COVER PLATES FOR POWER DISTRIBUTION SYSTEM

[75] Inventor: George C. Chaundy, Westchester, Pa.

[73] Assignee: AMP Incorporated, Harrisburg, Pa.

[21] Appl. No.: 893,071

[22] Filed: Jul. 31, 1986

[51] Int. Cl.$^4$ ............................................. H01R 13/74
[52] U.S. Cl. ...................................... 439/557; 174/55
[58] Field of Search ................. 174/55, 65, 66; 339/122, 123, 128, 91 F, 22 R, 198 J; 248/27.3, 27 B

[56] References Cited

U.S. PATENT DOCUMENTS

| | | | |
|---|---|---|---|
| 3,645,353 | 2/1972 | Cope et al. | 339/128 X |
| 3,812,450 | 5/1979 | Simovits et al. | 339/128 |
| 4,027,937 | 6/1977 | Norden | 339/128 X |
| 4,447,106 | 5/1984 | Houtz et al. | 339/126 R |
| 4,451,106 | 5/1984 | Wiseheart et al. | 339/128 X |

FOREIGN PATENT DOCUMENTS 1397562  6/1975  United Kingdom .................. 174/55

Primary Examiner—Eugene F. Desmond
Attorney, Agent, or Firm—Allan B. Osborne

[57] ABSTRACT

Cover plate for use in a wire raceway panel. More particularly, the cover plate includes cooperating latch members on one edge of the back face and a slot on the opposite edge for removably latching the cover plate in an opening in the panel. Telephone and data connectors are provided in the cover plate to provide an interconnection between telephones and other office equipment and appropriate telephone lines and data cable and wires in the raceway.

2 Claims, 5 Drawing Figures

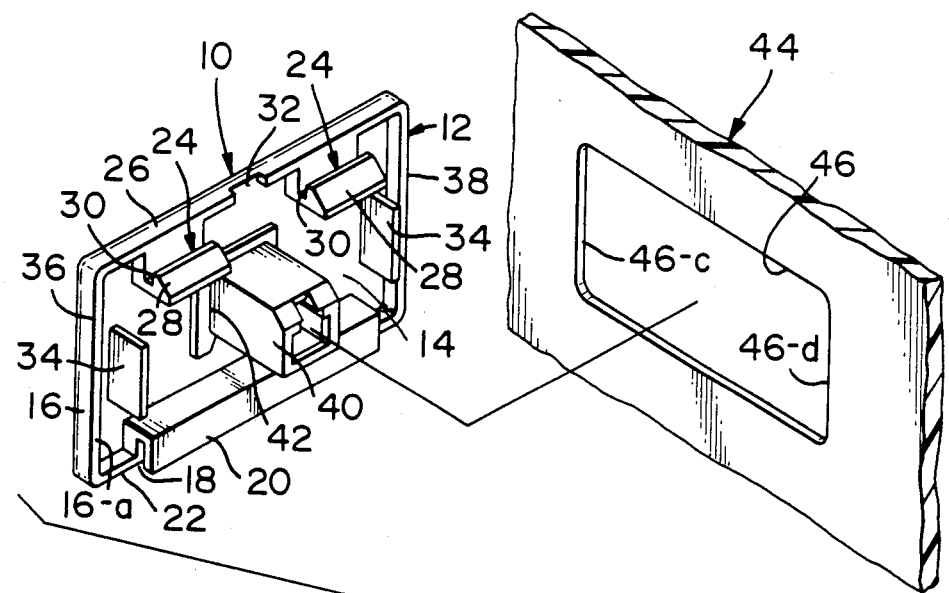
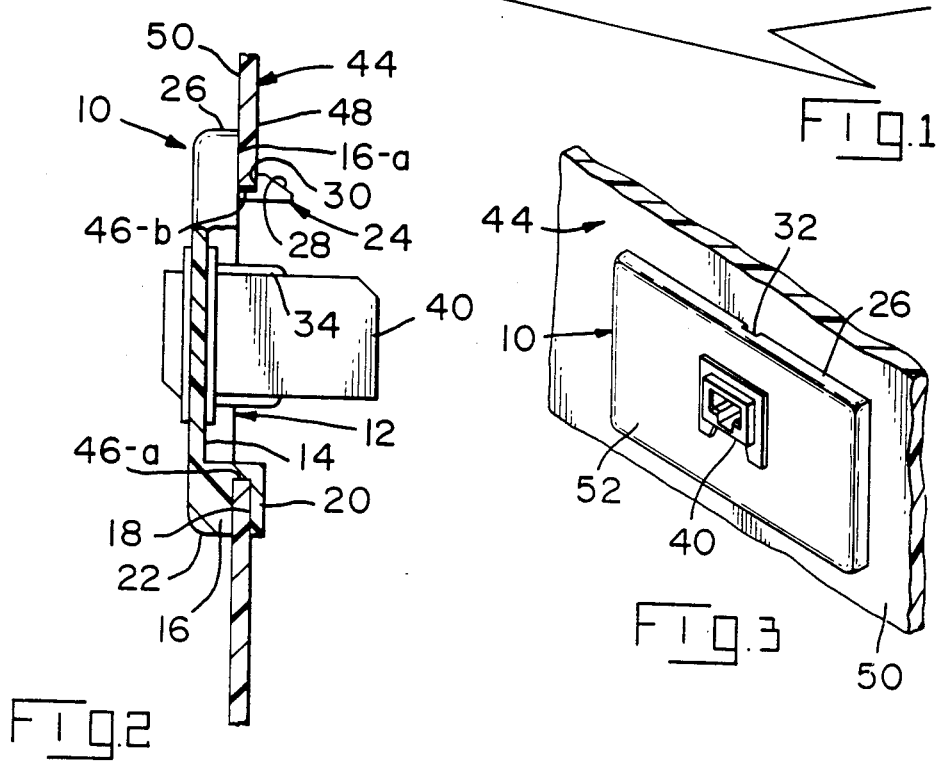
Fig.1
Fig.2
Fig.3

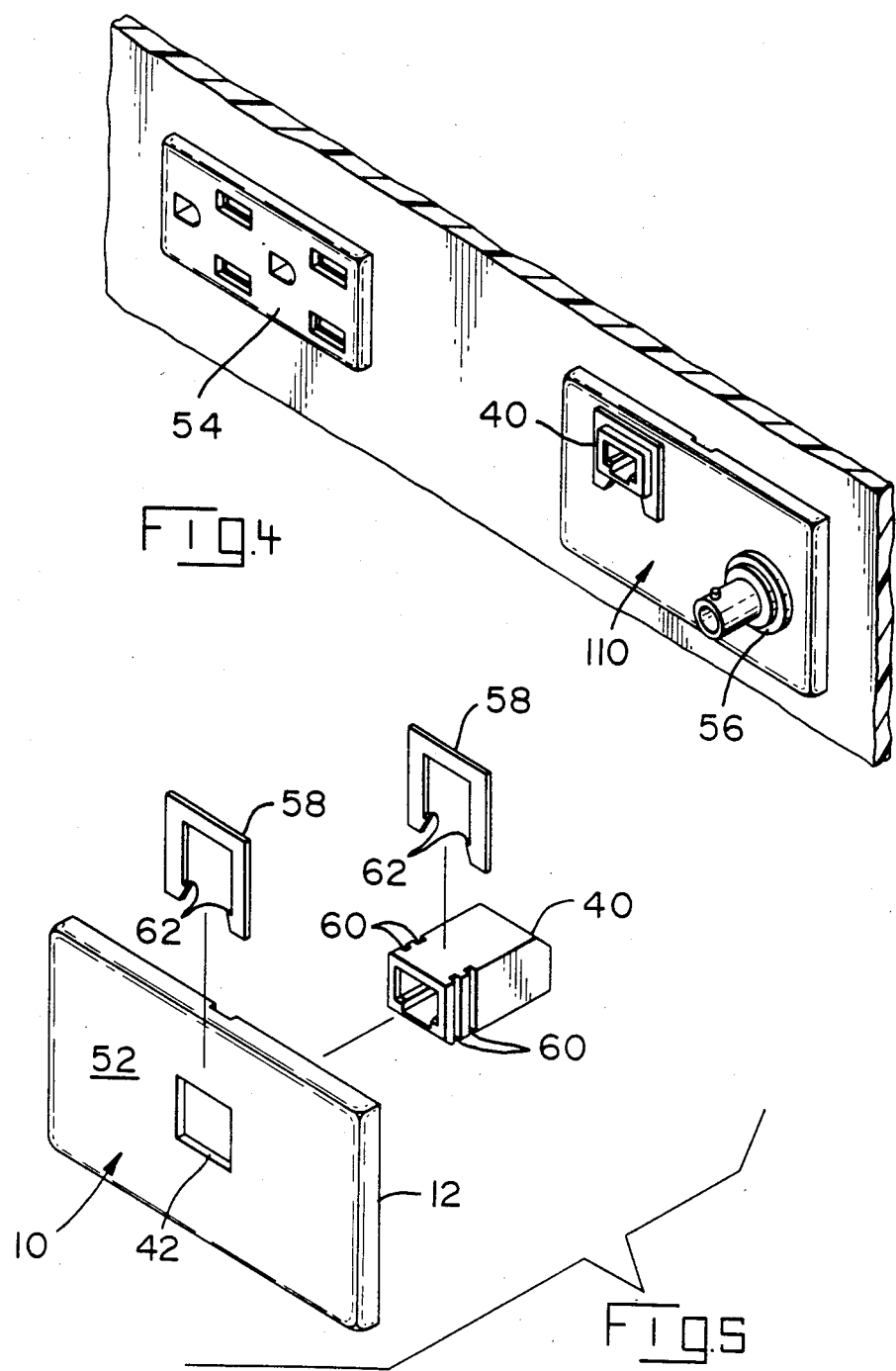

COVER PLATES FOR POWER DISTRIBUTION SYSTEM

FIELD OF THE INVENTION

The present invention relates to cover plates with electrical connector thereon for use with wiring raceways on modular office walls to provide telephone and data equipment access.

BACKGROUND OF THE INVENTION

Initially modular office walls with wiring raceways, located at the base of the walls or at desk-height, provided power for task lighting and office equipment such as typewriters and calculators. Access to the wiring within the raceway was through single and duplex receptacles. With the advent of personal computers and other data using equipment, a need has developed to provide convenient means to interconnect with communication, data and other wiring in the raceway and to provide an environment free of a jumble of wires and cables.

It is now proposed to provide removable cover plates for placing in raceway panels and having electrical and electronic interconnection devices which connect with wires in the raceway and provide plug-in capability for telephone, electronic and data equipment on the desk.

SUMMARY OF THE INVENTION

According to the present invention, removable cover plates are provided which snap into standard size openings in panels covering wire raceways in modular office walls. An outwardly open slot on one side of the back face of the plate slides onto an edge of the panel opening to cooperate with flexible latching hooks on the opposite side of the back face of the plate and which extend through the opening and removably catch on the inside surface of the opposite edge of the opening. A given cover plate may include singly or in combination, six-pin telephone jacks, eight-pin keyed telephone jacks, BNC coaxial data connectors, dual-coaxial connectors, TNC coaxial data connectors, subminiature D 25-pin data connectors for twisted pair or ribbon cable, and connectors for fiber optic cables.

BRIEF DESCRIPTION OF THE DRAWINGS

FIG. 1 is a perspective view of a back face of a cover plate of the present invention and a wire raceway panel on a modular office wall;

FIG. 2 is a cross-sectional view of the cover plate removably mounted in the panel;

FIG. 3 is a perspective view of the front face of the cover plate mounted in the panel;

FIG. 4 is a perspective view of a cover plate of the present invention mounted in a raceway panel along with a single outlet receptacle; and FIG. 5 is a perspective view of the cover plate of FIGS. 1-3 illustrating the method of mounting a six-pin telephone hack.

DESCRIPTION OF THE INVENTION

Cover plate 10 is molded from a suitable plastic such as polycarbonate or acrylonitrile-butadiene-styrene (ABS). The back face 12 of plate 10 includes recess 14 defined by rearwardly projecting rim 16 which extends around the edge of plate 10 and has a rear surface 16-a. Laterally open slot 18 is provided in elongated block 20 positioned adjacent rim 16 on side 22 of plate 10. A pair of rearwardly projecting, hook shaped latch members 24 are positioned adjacent rim 16 near opposite side 26 of plate 10. Each latch memeber 24 includes a beveled surface 28 and forwardly facing shoulder 30. Rim 16 is notched on side 26 between latch members 24 as indicated by reference numeral 32. Rearwardly extending locator tabs 34 are provided near each of the two short sides 36, 38 of plate 10.

As shown in FIGS. 1-3, plate 10 is provided with a six-pin telephone jack 40 located in opening 42 in plate 10. The mounting of jack 40 in opening 42 is described in detail with reference to FIG. 5.

A segment of wire raceway panel 44 of a modular office wall (not shown) having opening 46 therethrough is shown to the right of cover plate 10 in FIG. 1. Panel 44 covers a raceway (not shown) containing electrical wires, telephone lins and data cable (none of which are shown).

With reference to FIG. 2 as well as FIG. 1, after interconnecting jack 40 with the appropriate telephone line (not shown) in the raceway, cover plate 10 is mounted on panel 44 by tilting plate 10 to align slot 18 with the edge 46-a of opening 46 and then pushing plate 10 down and towards panel 44. As beveled surfaces 28 on latch members 24 engage opposite edge 46-b of opening 46, members 24 are resiliently deflected to pass through opening 46. Shoulders 30 engage inner surface 48 of panel 44 to latch plate 10 thereto. Locator tabs 34 center plate 10 by engaging and sliding alongside edges 46-c, 46-d (FIG. 1). Rear surface 16-a on rim 16 tightly abuts outer surface 50 of panel 14. As shown in FIG. 2, there is a slight gap between edge 46-b of opening 46 and latch members 24 which provides a very small degree of vertical play.

Removing plate 10 from panel 44 is accomplished by inserting a screwdriver (not shown) into notch 32, which is accessible from the front face 52 of plate 10 as shown in FIG. 3, and prying opening edge 46-b up and out of engagement with shoulders 30 on latch members 24. The flexibility of panel 44, which is made from polyvinyl chloride (PVC) or thin sheet steel, in cooperation with the aforementioned vertical play of plate 10 in opening 46, prevents damage to either plate 10 or panel 44.

FIG. 4 shows panel 44 with an electrical duplex receptacle 54 and cover plate 110 mounted therein. Receptacle 54, an integral part of a junction box (not shown) in the raceway, provides power outlets for task lighting and electrical equipment such as calculators and typewriters. Receptacles 54 are disclosed in U.S. Pat. No. 4,313,646 which is incorporated herein by reference. Cover plate 110 includes a BNC coaxial data connector 56 in addition to six-pin telephone jack 40. Other cover plates (not shown) of the present invention includes the following conventional connectors, dual coaxial connectors, TNC coaxial data connectors and subminiature D 25-pin data connectors (none shown) in combination with jacks 40 and connectors 56 and with each other or singly. Also fiber optic connectors (not shown) would be included.

The mounting of telephone jack 40 in opening 42 in cover plate 10 is shown in FIG. 5. The dimension of jack 40 is such as to slide into opening 42 easily but without play. U-shaped clips 58, one on the side of front face 52 and one on the side of back face 12, are slidably received in spaced grooves 60 on opposing side surfaces of jack 40 with the space between adjacent grooves 60 being slightly greater than the thickness of panel 44. Shoulders 62 on clips 58 engage jack 40 to hold clips 58 thereon.

As can be discerned, a cover plate has been disclosed for use with panels covering wire raceways in modular office walls. The cover plates include cooperating slot and latch members which engage the edges of an opening in the panel. The cover plates further include voice and data connectors to interconnect telephone, electronic and data equipment in the office with appropriate telephone lines, wires and cables in the raceway. The cover plates are easily removable and are interchangeable.

I claim:

1. A cover plate for use with a wire raceway panel comprising:

dielectric plate means having a front face and a back face;

voice, data and/or fiber optic connectors mounted in said plate means with pluggable access on the front face for interconnecting voice and data equipment on the outside of the panel and means on the back face for connecting with appropriate wires and cables within the raceway; and latch means on the plate means for latching said plate means in an opening in said panel, said latch means including slot means spaced from and extending along one edge of said back face and opening out parallel to the plane of said plate means and a latch member projecting outwardly from an opposite edge of said back face perpendicularly to the plane of said plate means and having shoulder means facing said back face, said slot means adapted to slide onto one edge of said opening in said panel and said latch member adapted to extend into said opening with said shoulder means engaging an inner surface of said panel adjacent an opposite edge of said opening and with a perimeter of said back face abutting the outer surface of said panel around the periphery of said opening.

2. The cover plate of claim 1 wherein said backface includes a rearwardly projecting rim extending around the perimeter thereof, said rim having a notch therethrough for providing access for pry means for prying said plate from said panel.

* * * * *